United States Patent [19]
Tsushima et al.

[11] Patent Number: 5,323,258
[45] Date of Patent: Jun. 21, 1994

[54] HOMODYNE OPTICAL RECEIVER EQUIPMENT

[75] Inventors: Hideaki Tsushima, Wako; Ryoji Takeyari, Kokubunji; Shinya Sasaki, Kodaira; Shigeki Kitajima; Katsuhiko Kuboki, both of Kokubunji, all of Japan

[73] Assignee: Hitachi, Ltd., Tokyo, Japan

[21] Appl. No.: 771,444

[22] Filed: Oct. 4, 1991

[30] Foreign Application Priority Data

Oct. 5, 1990 [JP] Japan ................... 2-266208

[51] Int. Cl.$^5$ ........................................... H04B 10/06
[52] U.S. Cl. .................... 359/190; 359/192; 359/156
[58] Field of Search ........ 359/190, 189, 191, 192–194, 359/162, 156

[56] References Cited

U.S. PATENT DOCUMENTS

| | | | |
|---|---|---|---|
| 4,718,120 | 1/1988 | Tzeng | 359/192 |
| 5,007,106 | 4/1991 | Kahn et al. | 359/190 |
| 5,008,958 | 4/1991 | Cimini, Jr. et al. | 359/192 |
| 5,060,312 | 10/1991 | Delavaux | 359/192 |

FOREIGN PATENT DOCUMENTS

| | | | |
|---|---|---|---|
| 0298484 | 1/1989 | European Pat. Off. | 359/190 |
| 0322893 | 7/1989 | European Pat. Off. | |

OTHER PUBLICATIONS

ECOC 89 Technical Digest, ThA21-6, Sep. 1989, pp. 413–416.
Electronics Letters, vol. 26, No. 10, pp. 648–649.
Electronics Letters, vol. 24, No. 15, pp. 979–980.
IEEE Photonics Technology Letters, vol. 2, No. 5, May 1990, New York, US, pp. 367–370, Atlas et al.: *An Optical PSK Homodyne Transmission Experiment Using 1320nm Diode-Pumped Nd:YAG Lasers*.
Journal of Optical Communications, vol. 9, No. 1 Mar. 1988, Berlin, DE, pp. 27–28; Fischer: *A 700 Mbit/s PSK Optical Homodyne System with Balanced Phase Locked Loop*.
Proceedings of the Fourth Tirrenia International Workshop on Digital Communications, Sep. 1989, Tirrenia, IT, pp. 19–34; Kuwahara et al.: *Modulation and Demodulation Techniques in Coherent Communications*.

Primary Examiner—Richard E. Chilcot, Jr.
Assistant Examiner—K. Negash
Attorney, Agent, or Firm—Kenyon & Kenyon

[57] ABSTRACT

A homodyne optical receiver includes a polarization beam splitter for dividing an optical signal into an optical signal with horizontal polarization and an optical signal with vertical polarization. Optical couplers combine two optical signals of the two polarized components with two optical local signals, which signals are almost matched therewith in polarization, and in a state where they are matched with each other in phase. Detectors homodyne-detect respective output optical signals of the optical couplers and two weighting circuits assign output signals of the detectors weights which are approximately proportional to amplitudes thereof, respectively. An adder adds output signals of the weighting circuits.

7 Claims, 7 Drawing Sheets

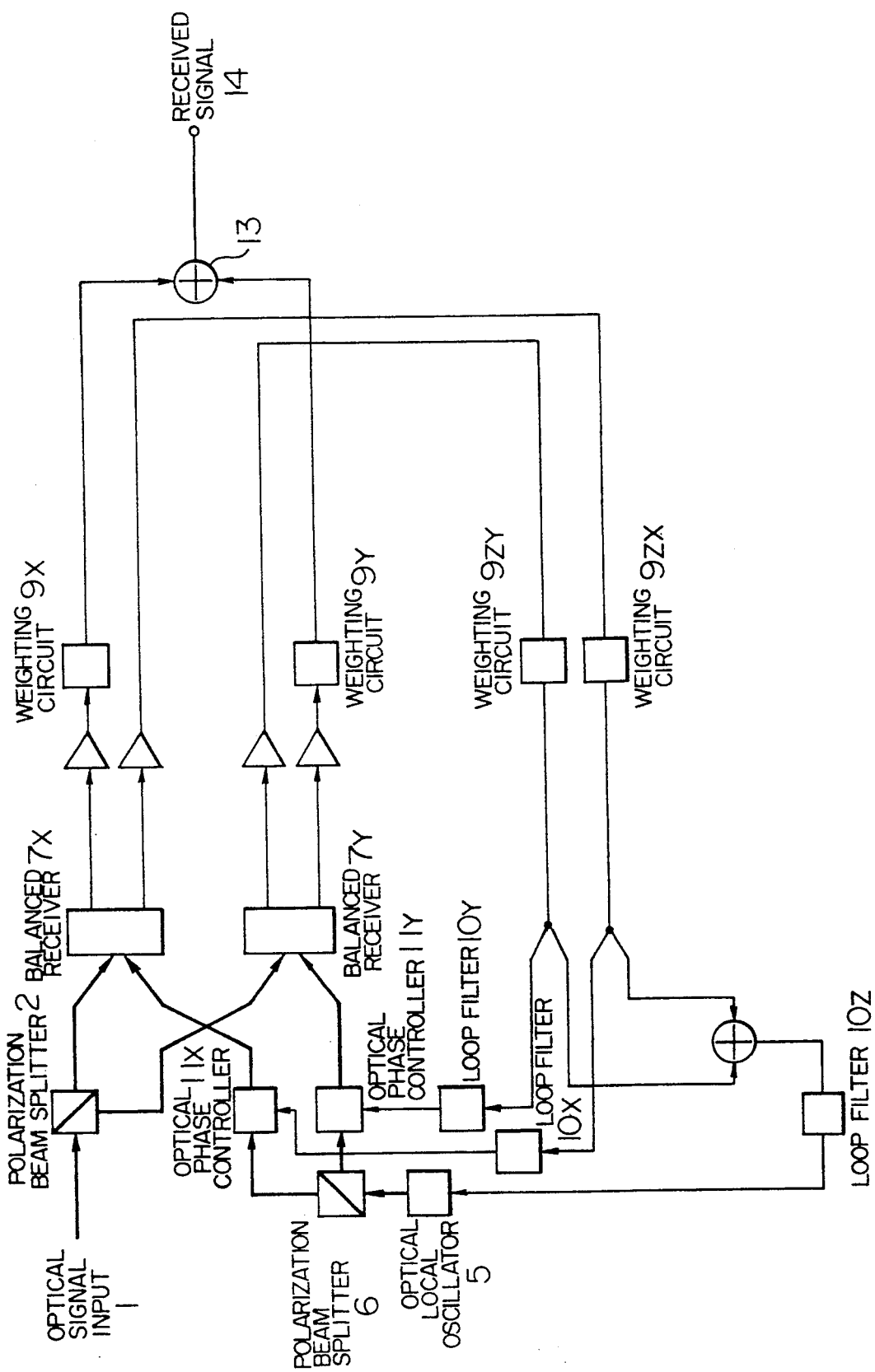

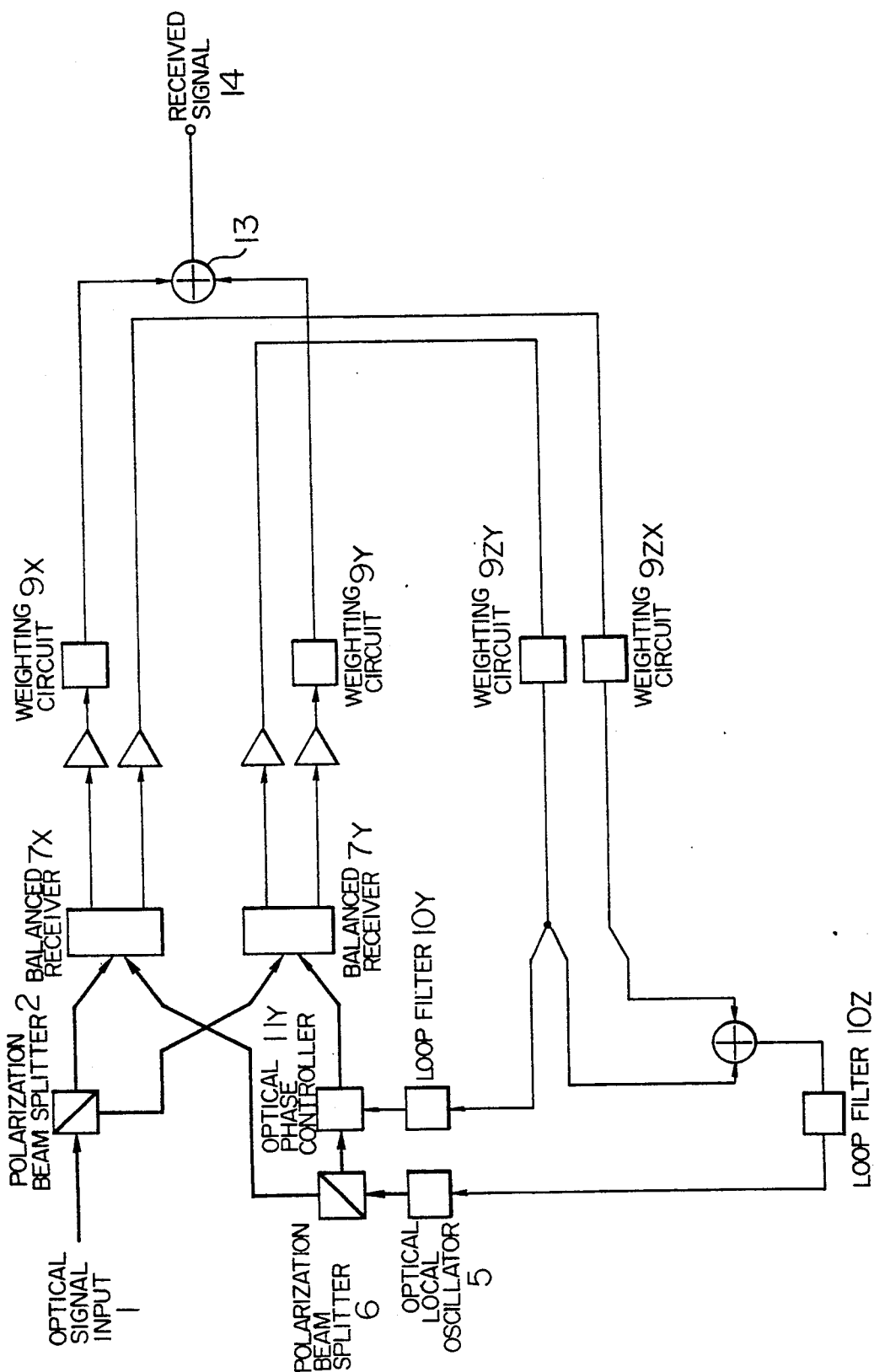

HOMODYNE OPTICAL RECEIVER EQUIPMENT

BACKGROUND OF THE INVENTION

The present invention relates to a homodyne optical receiver equipment, and in particular to an optical receiver equipment, which is stable against variations in the polarization of optical signals.

In a homodyne optical receiver equipment it is necessary to make an optical signal input to the optical receiver equipment and an optical local signal emitted by an optical local oscillator incorporated in the optical receiver equipment match with each other in phase and polarization. This is because mismatch in the phase and the polarization can cause worsening in the reception sensitivity of the optical receiver equipment. Heretofore, no techniques have been proposed for polarization matching, while techniques for phase matching have been proposed. For example, in Reference 1 "ECO 89, Technical Digest, ThA 21-6, pp. 413-416, September 1989", Reference 2 "Electronics Letters, Vol. 26, No. 10, pp. 648-649, May 1990", etc. excellent methods for the phase matching have been proposed and verified. However, there are no proposals for polarization matching and in experiments polarization matching was effected by using a manual polarization controller. Further, in this reference, a part of a signal obtained by homodyne detection is branched off and phase matching is realized by controlling a semiconductor laser acting as an optical local oscillator while negatively feeding back thereto a current proportional to the branched signal, which has passed through a loop filter. Furthermore, it is known that such phase matching can be realized by controlling an optical phase controller, in which light output by the semiconductor laser is input, while feeding it back thereto.

For making a homodyne optical receiver equipment usable in practice it is necessary to add a function of automatically effecting the polarization matching to a phase matching function.

SUMMARY OF THE INVENTION

The present invention relates to a homodyne optical receiver, for which a polarization matching function is added to a homodyne optical receiver equipment having a phase matching function to have receiving characteristics stable also against variations in the polarization.

A homodyne optical receiver can be achieved according to the present invention by dividing an optical signal into a horizontally polarized wave and a vertically polarized wave, combining each of two optical local signals, which are approximately matched with each of the optical signals of different polarization components, with the respective polarized wave in a state to be matched with each other in phase, and adding two synthesized waves thus obtained after having detected and suitably weighted them by means of photodiodes.

The electric field $E_S$ of an optical signal can be represented by $$E_S = \sqrt{P_s} \, [\sqrt{\alpha} \cdot \cos(\omega t + \theta + \theta_{sx}) \cdot X + \sqrt{(1-\alpha)} \cdot \cos(\omega t + \theta + \theta_{sy}) \cdot Y] \quad (1)$$

where $P_s$ and $\omega$ represent the intensity and the angular frequency of the optical signal, respectively, and $\theta$ indicates the information signal. X and Y denote unit vectors in a horizontal and a vertical direction, respectively, with respect to the propagation direction of the optical signal. $\theta_{sx}$ and $\theta_{sy}$ represent the phases of the two components of the optical signal, respectively, and $\alpha$ denotes the ratio of the light intensity of the component with horizontal polarization, satisfying $0 < \alpha < 1$. For an optical signal transmitted through an optical fiber it is known that the phases ($\theta_{sx}$ and $\theta_{sy}$) and the polarization ($\alpha$) vary due to external perturbations, etc., to which the optical fiber is subjected.

According to a prior art technique, an optical local signal having the same polarization state as the optical signal was generated by means of a manual polarization controller. The optical local signal generated at this time has the same polarization state (same $\alpha$) as the optical signal and it can be expressed by $$E_L = \sqrt{P_L} \, [\sqrt{\alpha} \cdot \cos(\omega t + \theta_{Lx}) \cdot X + \sqrt{(1-\alpha)} \cdot \cos(\omega t + \theta_{Ly}) \cdot Y] \quad (2)$$

where $P_L$ represents the intensity of the optical local signal, and $\theta_{Lx}$ and $\theta_{Ly}$ denote the phases of the two components of the optical local signal, respectively. The phase matching of the optical local signal $E_L$ with the optical signal $E_S$ can be realized by the prior art technique and it is described, e.g., in Reference 1 in detail. That is, the phases ($\theta_{Lx}$ and $\Theta_{Ly}$) of the optical local signal are controlled so as to follow variations in the phases ($\theta_{sx}$ and $\theta_{sy}$). According to Reference 1, the phase control of the optical local signal can be realized by controlling current injected in a semiconductor laser. Further it is known, in general, that the phase control can be effected also by inputting light output by the optical local oscillator to an optical phase controller consisting of an electro-optical crystal, etc. while controlling a voltage applied to the optical phase controller. According to the present invention, the phase matching is effected by the prior art technique and in addition the polarization matching is also realized and used by a new idea.

According to the present invention, at first two optical signals represented by the following formulas are obtained by dividing an optical signal into two polarization components in a horizontal and a vertical direction by means of a polarization beam splitter;

$$E_{Sx} = \sqrt{P_S} \cdot \sqrt{\alpha} \cdot \cos(\omega t + \theta + \theta_{Sx}) \cdot X \quad (3X)$$

$$E_{Sy} = \sqrt{P_S} \cdot \sqrt{(1-\alpha)} \cdot \cos(\omega t + \theta + \theta_{Sy}) \cdot Y \quad (3Y)$$

On the other hand, according to the present invention, the optical local signal is divided previously into two polarization components having intensities approximately equal to each other. The divided two components can be expressed by $$E_{Lx} = \sqrt{(P_L/2)} \cdot \cos(\omega t + \theta_{Lx}) \cdot X \quad (4X)$$

$$E_{Ly} = \sqrt{(P_L/2)} \cdot \cos(\omega t + \theta_{Ly}) \cdot Y \quad (4Y)$$

Then (3X) and (4X) as well as (3Y) and (4Y) are combined with each other, respectively, in a state where the respective polarizations are in accordance with each other. At this time the phase matching between $\theta_{Sx}$ and $\theta_{Lx}$ as well as $\theta_{Sy}$ and $\theta_{Ly}$ can be realized by the prior art technique. That is, the phase can be controlled by controlling current injected in the semiconductor laser serving as the optical local oscillator, controlling a voltage applied to the electro optical crystal, etc. Consequently, electric signals $V_x$ and $V_y$ obtained by homodyne-detecting the two synthesized waves can be expressed by $$V_x = K\sqrt{a} \cdot \sqrt{P_S} \cdot \sqrt{P_L} \cdot \cos\theta \quad (5X)$$

$$V_y = K\sqrt{(1-a)} \cdot \sqrt{P_S} \cdot \sqrt{P_L} \cdot \cos\theta \quad (5Y)$$

where K is a constant determined by the homodyne optical receiver. When the electric signals given by Eqs. (5X) and (5Y) are added to each other after having assigned them weights proportional to the respective amplitudes, the following formulas are obtained $$V = \sqrt{a}V_x + \sqrt{(1-a)}V_y \quad (6)$$

$$= 2K \cdot \sqrt{P_S} \cdot \sqrt{P_L} \cdot \cos\theta \quad (7)$$

Eq. (7) contains no $a$. As described above, according to the present invention, it is possible to obtain a received signal independent from the polarization state of an optical signal. That is, since the polarization matching can be automatically realized, it is possible to realize a homodyne optical receiver equipment having receiving characteristics stable also against variations in the polarization.

BRIEF DESCRIPTION OF THE DRAWINGS

FIG. 6 is a diagram showing a fourth embodiment of the homodyne optical receiver equipment according to the present invention.

FIG. 7 is a diagram showing a fifth embodiment of the homodyne optical receiver equipment according to the present invention.

DETAILED DESCRIPTION

Figure 1:
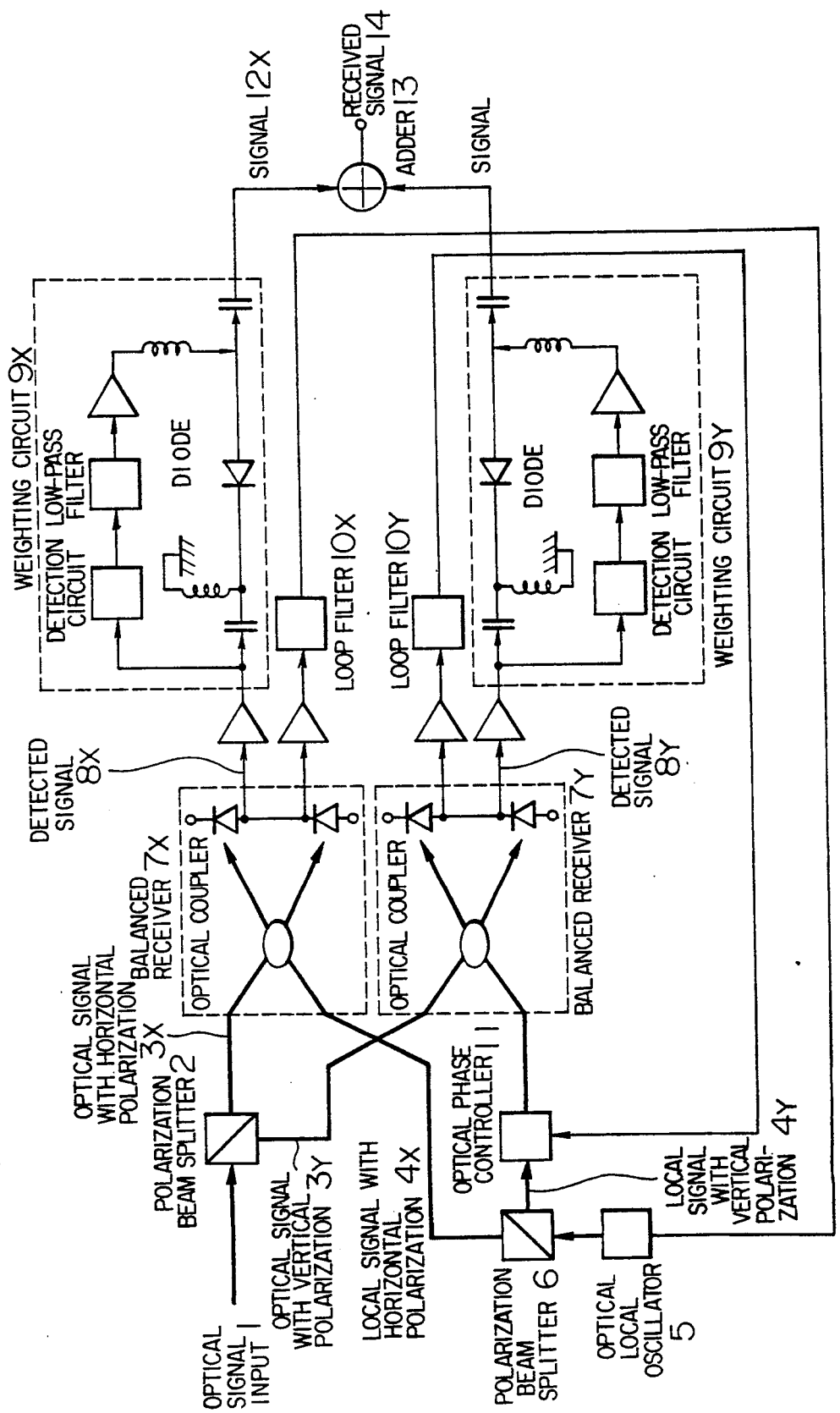
FIG. 1 is a diagram showing a first embodiment of the homodyne optical receiver equipment according to the present invention.

FIG. 1 shows a first embodiment of the homodyne optical receiver according to the present invention.

An optical signal 1 is input to a polarization beam splitter 2 to divide it into optical signals 3X and 3Y having polarization components in a horizontal and a vertical direction, respectively. The two optical signals obtained here are expressed by Eqs. (3X) and (3Y) described previously, respectively. An optical local oscillator 5 can be realized by a semiconductor laser, etc. An optical local signal output by the optical local oscillator 5 is divided into two optical local signals having polarization components in a horizontal and a vertical direction by a polarization beam splitter 6 (constituted by, for example, a prism), which have intensities approximately equal to each other. The optical local signals having polarization components in the horizontal and the vertical direction thus obtained are denoted by 4X and 4Y, respectively. The optical local signals 4X and 4Y are expressed by Eqs. (4X) and (4Y) described previously, respectively. The light beams described above are input to respective balanced receivers. A balanced receiver includes an optical coupler combining the optical signal with the optical local signal and two photodiodes detecting each of the two synthesized light beams obtained as outputs of the optical coupler and subtracting one from the other. The optical signal 3X and the optical local signal 4X described above are inputted to the balanced receiver 7X, which outputs a detected signal 8X. Similarly the optical signal 3Y and the optical local signal 4Y described above are input to the balanced receiver 7Y, which outputs a detected signal 8Y. The detected signals 8X and 8Y are expressed by Eqs. (5X) and (5Y) described previously, respectively. The detected signal 8X is divided into two signals, one of which is input to a weighting circuit 9X and output as a signal 12X. The other of these two signals is negatively fed back to the optical local oscillator 5 through a loop filter 10X to control the injected current. The phase $\theta_{Sx}$ of the optical signal can be matched with the phase $\theta_{Lx}$ of the optical local signal by this negative feedback. The detail of this phase matching method is described in Reference 1. The weighting circuit can consist of a detection circuit, a low pass filter (LPF), a diode, etc. and give the detected signal input to the weighting circuit a weight proportional to the amplitude thereof. The detail of the weighting circuit is described in "Electronics Letters, Vol. 24, No. 15, pp. 979-980, May 1988". Similarly the detected signal 8Y is divided into two signals, one of which is inputted to another weighting circuit 9Y and outputted as a signal 12Y. The other of these two signals is negatively fed back to an optical phase controller 11 through another loop filter 10Y to control the voltage applied thereto in order to match the phase $\theta_{Sy}$ with the phase $\theta_{Ly}$ of the optical local signal. The optical phase controller 11 can be realized by using an electro-optical crystal, etc. The signals 12X and 12Y are expressed by the first and the second term in Eq. (6), respectively. Consequently, a signal 14 obtained by adding the signals 12X and 12Y by means of an adder 13 is expressed by Eq. (7), which is a received signal independent of the polarization.

As described above, according to the present embodiment, an effect is obtained that it is possible to realize a homodyne optical receiver having receiving characteristics which are stable against variations in the polarization.

Figure 2A:
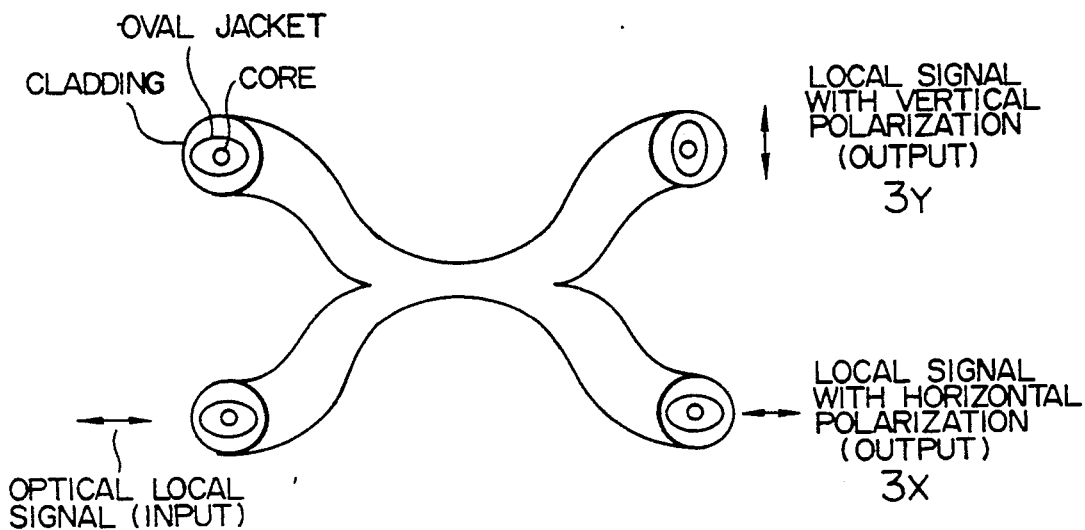
FIG. 2A is a diagram showing a polarization plane conserving optical coupler.

Further, the present invention is not restricted to the embodiment described above. As a first example, the polarization beam splitter may be an optical coupler constituted by a polarization plane conserving optical fibers. In this polarization plane conserving optical coupler, the optical local signal is input to an input terminal of a polarization plane conserving optical fiber consisting of a core, an oval jacket and a cladding, as indicated in FIG. 2A. The local signal with horizontal polarization 3X is output at one of the output terminals, while the local signal with vertical polarization 3Y is output at the other of the output terminals. In this way the intensity of the optical local signal is divided into two on the output side.

As a second example, no balanced receivers may be used. Between the two outputs of the optical coupler constituting each of the balanced receivers only one of them may be detected by the photodiode to obtain the detected signal 8. In this case, although the reception sensitivity of the homodyne optical receiver is lowered, receiving characteristics which are stable against variations in the polarization can be obtained similarly. As a third example, no weighting circuits may be used. In this case, a signal obtained as the received signal is given by $$V = V_x + V_y \qquad (7')$$
$$= 2K \cdot \sqrt{P_S} \cdot \sqrt{P_L} \cdot \cos\theta \cdot \{\sqrt{\alpha} + \sqrt{(1-\alpha)}\}$$

Figure 2B:
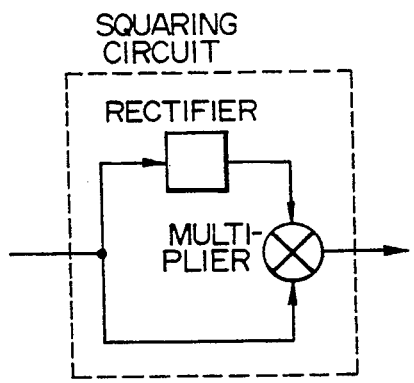
FIG. 2B is a diagram showing an embodiment of a squaring circuit.

Although the received signal expressed by Eq. (7) depends on the polarization $\alpha$, the width of variations is within about 3 dB. Compared with the prior art homodyne optical receiver equipment, the dependence on the polarization is alleviated. As a fourth example, a squaring circuit may be used instead of each of the weighting circuits. FIG. 2B shows an example of the construction of the squaring circuit. The squaring circuit can be composed of a rectifier and a multiplier to provide a signal almost identical to the signal expressed by Eq. (7) for the received signal. That is, it can realize a homodyne optical receiver having receiving characteristics which are stable against variations in the polarization.

Figure 3:
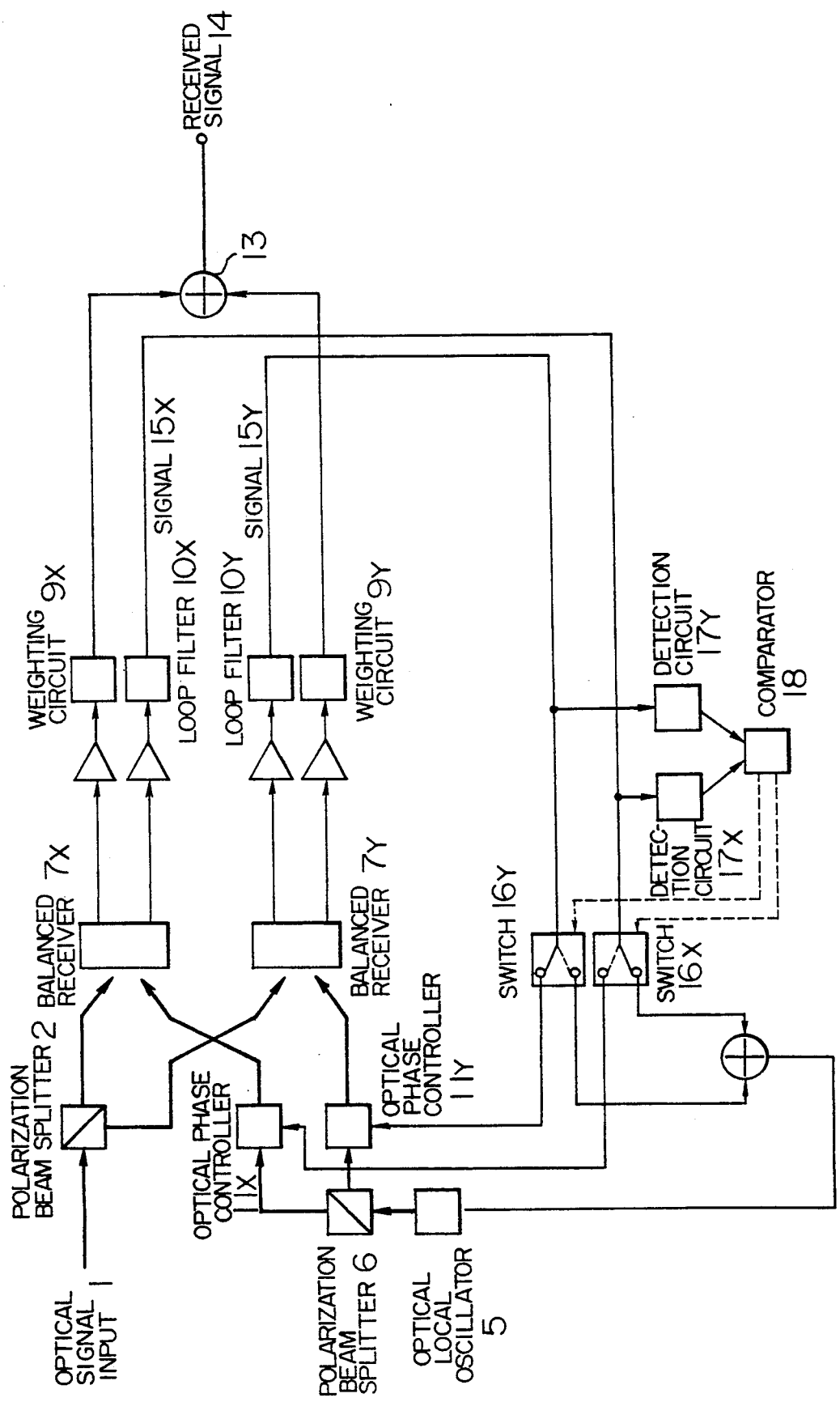
FIG. 3 is a diagram showing a second embodiment of the homodyne optical receiver equipment according to the present invention.

FIG. 3 shows a second embodiment of the homodyne optical receiver equipment according to the second invention. In the present embodiment an optical phase controller 11X is disposed also for the optical local signal with horizontal polarization 4X. Further, there are disposed switches 16X and 16Y switching over the circuits, which the signals 15X and 15Y output by the loop filters are to control. The switches described above are switched over so that in the case where electric power of the signal 15X is higher than that of the signal 15Y, the signal 15X controls the current injected in the optical local oscillator 5, while the signal 15Y controls the voltage applied to the optical phase controller 11Y. On the contrary, in the case where electric power of the signal 15X is lower than that of the signal 15Y, they are switched over so that the signal 15Y controls the current injected in the optical local oscillator 5, while the signal 15X controls the voltage applied to the optical phase controller 11X. At this time, the optical phase controller, which is not controlled, acts as a mere optical waveguide and does not control the phase of light. Further the switching over of the switches as described above can be realized by disposing detection circuits detecting the electric powers of the signals 15X and 15Y, respectively, whose outputs are inputted to a comparator 18. The comparator 18 may control the switches 16X and 16Y so that the output of the switch, to which the signal having higher electric power is inputted, is connected with the optical local oscillator, while the other is connected with the optical phase controller. In general, the magnitude of the optical phase, which can be controlled by the semiconductor laser serving as the optical local oscillator, is greater than that obtained by the optical phase controller. Consequently, it is possible to realize a more stable phase matching, when the phase of the optical local oscillator is controlled by using the detected signal having a greater contribution to the received signal, i.e., detected signal having a higher electric power. This is an effect which the present embodiment has in addition to the effect, which the first embodiment has.

Figure 4:
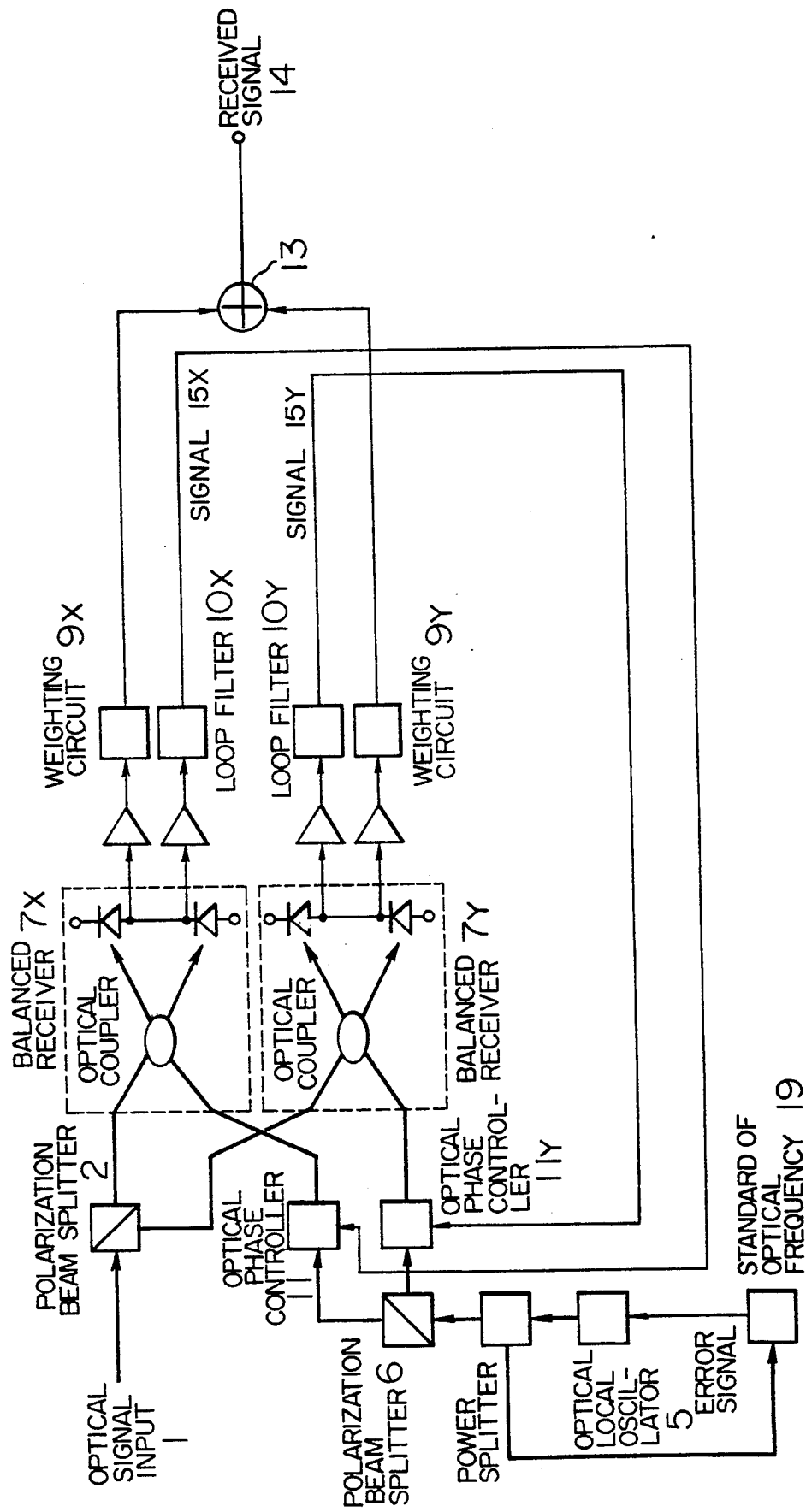
FIG. 4 is a diagram showing a third embodiment of the homodyne optical receiver equipment according to the present invention.

FIG. 4 shows a third embodiment of the homodyne optical receiver equipment according to the present invention. In the present embodiment the optical phase controllers 11X and 11Y are controlled by the signals 15X and 15Y, respectively. This is useful, in the case where the phases of the optical signal and the optical local signal are stable. Stabilization of the phase of the optical local signal can be realized e.g. by branching a part of light outputted by the optical local oscillator by means of a power splitter, comparing the branched light beam with a light beam emitted by a standard of optical frequency 19 in the frequency, and controlling the optical local oscillator so that both of them are in accordance with each other.

Figure 5:
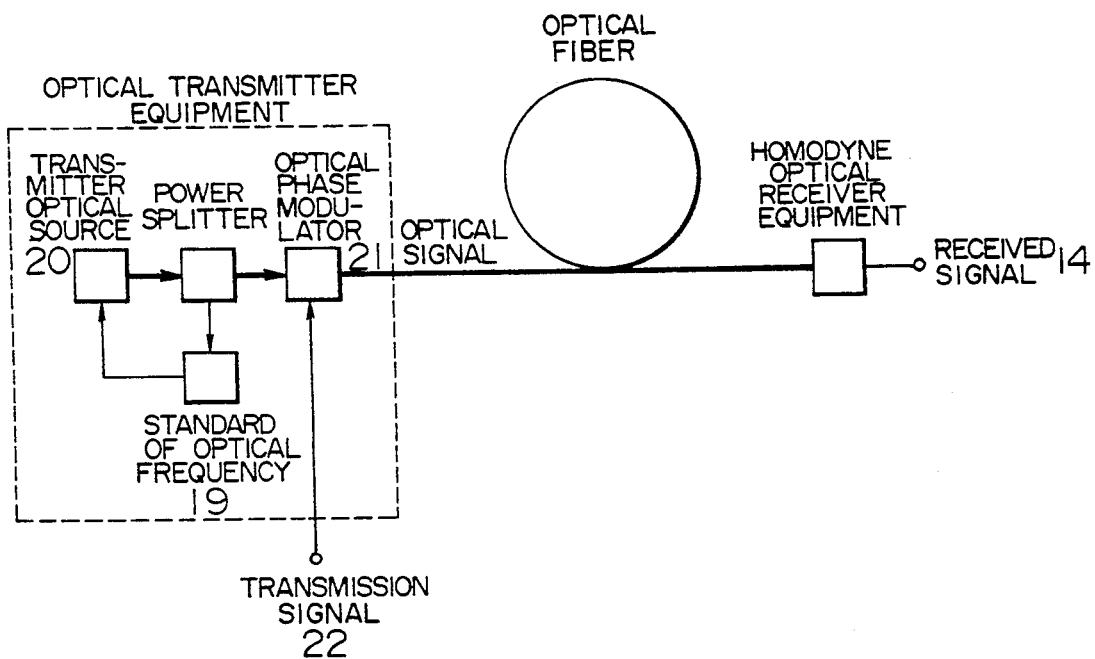
FIG. 5 is a diagram showing an embodiment of an optical transmission system using the homodyne optical receiver equipment according to the present invention.

FIG. 5 shows an embodiment of an optical transmission system using a homodyne optical receiver equipment according to the present invention. Either one of the embodiments indicated in FIGS. 1 to 3 may be used for the homodyne optical receiver equipment in the figure. For an optical transmitter equipment an equipment as described, e.g., in Reference 1 or 2 may be used. A transmitter optical source 20 can be realized by using a semiconductor laser similarly to the optical local oscillator 5. The transmitter optical source 20 may be stabilized in the frequency by using a standard of optical frequency 19. A light beam output by the transmitter optical source 20 is subjected to phase modulation or amplitude modulation by an optical phase modulator 21, responding to a transmission signal. An optical signal subjected to the modulation is sent to an optical fiber.

FIG. 6 shows a fourth embodiment of the homodyne optical receiver equipment according to the present invention. In the fourth embodiment, similarly to the third embodiment the optical phase controllers 11X and 11Y are controlled by the signals obtained by making the outputs of the balanced receivers pass through the loop filters 10X and 10Y, respectively. In the present embodiment the optical local oscillator 5 is controlled by a signal made pass through a loop filter 10Z, which signal is obtained by weighting the outputs of the balanced receivers for the horizontal and the vertical polarization proportionally to the amplitudes of the outputs and adding them with each other, while feeding it back thereto. The object of the weighting is that a phase error signal controlling the optical local oscillator 5 is not influenced by variations in the frequency of the received signal due to variations in the polarization state. The present receiver is operated so that the frequency of the optical local oscillator 5 follows the frequency of the received signal, independently of the polarization state, and that the phase of the optical local signal follows the phase of the optical received signal in the different balanced receivers owing to the optical phase controllers 11X and 11Y.

FIG. 7 shows a fifth embodiment of the homodyne optical receiver equipment according to the present invention. In the fifth embodiment one of the loop filters and one of the phase controllers in the fourth embodiment are omitted. In the present receiver the phase of the optical local oscillator 5 follows the phase of the optical received signal with horizontal polarization. Further the optical phase controller 11Y is operated so that the vertical polarization component of the optical local signal follows the phase of the vertical polarization of the optical received signal. When the horizontal polarization component of the received signal decreases, the feedback signal to the optical local oscillator 5 for the vertical polarization component becomes predominant owing to the weighting circuits 9ZX and 9ZY and when the horizontal polarization component of the received signal becomes 0, the equipment is operated only by the system for the vertical polarization.

Although in the fourth and the fifth embodiment the weighting circuits for the signal system and the phase control system are separated from each other, one circuit may be used therefor in common, the output of which is separated. Further, the input of the loop filter for controlling the optical phase controller in the fourth and the fifth embodiment may not be made pass through the weighting circuit, but the output of the balanced receiver may be inputted directly thereto.

According to the present invention, it is possible to realize an optical transmission system having characteristics stable against variations in the polarization of the optical signal.

Further the optical transmission system according to the present invention is not restricted to the embodiments described previously. As a first example, in the optical transmission equipment the optical signal may be modulated by direct modulation of the transmitter optical source. For example, it is known that the frequency modulation and the phase modulation can be realized also by modulating directly the current injected in the semiconductor laser. As a second example, a plurality of optical transmission equipments may be disposed. In this case, frequencies of optical signals outputted from different optical transmitter equipments should be set so as to be different from each other. The optical signals output from the different optical transmitter equipment can be multiplexed in the optical frequency by using an optical coupler or an optical synthesizer. As the result, it is possible to transmit a great capacity of information through one optical fiber. As a third example, a plurality of homodyne optical receiver equipment may be disposed. In this case an effect can be obtained that a plurality of users can utilize simultaneously the optical receiver equipment.

As described above, according to the present invention it is possible to realize a homodyne optical receiver equipment having characteristics stable against variations in the phase and the polarization of the optical signal and an optical transmitter equipment using it.

What is claimed is:

1. A homodyne optical receiver comprising:
  a first polarization beam splitter which divides an optical signal into an optical signal with horizontal polarization and an optical signal with vertical polarization;
  an optical local oscillator which outputs an optical local signal;
  a second polarization beam splitter which divides said optical local signal into an optical local signal with horizontal polarization and an optical local signal with vertical polarization;
  an optical phase controller which controls a phase of said optical local signal with vertical polarization;
  a balanced receiver, which homodyne-detects said optical signal with horizontal polarization by using said optical signal with horizontal polarization to output a first detected signal;
  a balanced receiver, which homodyne-detects said optical signal with vertical polarization by using said optical local signal with vertical polarization to output a second detected signal;
  a first branch circuit, which branches said first detected signal into a first branch signal and a second branch signal;
  a second branch circuit, which branches said second detected signal into a third branch signal and a fourth branch signal;
  a first weighting circuit which assigns the first branch signal branched from said first detected signal a weight proportional to an amplitude thereof;
  a second weighting circuit which assigns the third branch signal branched from said second detected signal a weight proportional to an amplitude thereof;
  an adder, which adds output signals of said first weighting circuit and said second weighting circuit to output a received signal;
  a first loop filter which removes high frequency components from the second branch signal branched from said first detected signal;
  a second loop filter which removes high frequency components from the fourth branch signal branched from said second detected signal;
  a first feedback line coupling said optical local oscillator and said first loop filter; and
  a second feedback line coupling said optical phase controller and said second loop filter.

2. A homodyne optical receiver comprising:
  a polarization beam splitter which divides an optical signal into an optical signal with horizontal polarization and an optical signal with vertical polarization;
  an optical local oscillator which outputs an optical local signal;
  an optical coupler which divides said optical local signal into an optical local signal with horizontal polarization and an optical local signal with vertical polarization;
  an optical phase controller which controls a phase of said optical local signal with vertical polarization;
  a balanced receiver, which homodyne-detects said optical signal with vertical polarization by using said optical signal with vertical polarization to output a second detected signal;
  a balanced receiver, which homodyne-detects said optical signal with horizontal polarization by using said optical local signal with horizontal polarization to output a first detected signal;
  a first branch circuit, which branches said first detected signal into a first branch signal and a second branch signal;
  a second branch circuit, which branches said second detected signal into a third branch signal and a fourth branch signal;
  a first weighting circuit which assigns the first branch signal branched from said first detected signal a weight proportional to an amplitude thereof;
  a second weighting circuit which assigns the third branch signal branched from said second detected signal a weight proportional to an amplitude thereof;

an adder, which adds output signals of said first weighting circuit and said second weighting circuit to each other to output a received signal;

a first loop filter which removes high frequency components from the second branch signal branched from said first detected signal;

a second loop filter which removes high frequency components from the fourth branch signal branched from said second detected signal;

a first feedback line coupling said optical local oscillator and said first loop filter; and a second feedback line coupling said optical phase controller and said second loop filter.

3. A homodyne optical receiver comprising:

a first polarization beam splitter which divides an optical signal into an optical signal with horizontal polarization and an optical signal with vertical polarization;

an optical local oscillator which outputs an optical local signal;

a second polarization beam splitter which divides said optical local signal into an optical local signal with horizontal polarization and an optical local signal with vertical polarization;

an optical phase controller which controls a phase of said optical local signal with vertical polarization;

a balanced receiver, which homodyne-detects said optical signal with horizontal polarization by using said optical signal with horizontal polarization to output a first detected signal;

a balanced receiver, which homodyne-detects said optical signal with vertical polarization by using said optical local signal with vertical polarization to output a second detected signal;

a first branch circuit, which branches said first detected signal into a first branch signal and a second branch signal;

a second branch circuit, which branches said second detected signal into a third branch signal and a fourth branch signal;

a first squaring circuit, which squares said first detected signal, which is the first branch signal from said first branch circuit;

a second squaring circuit, which squares said second detected signal, which is the third branch signal from said second branch circuit;

an adder, which adds output signals of said first squaring circuit and said second squaring circuit to output a received signal;

a first loop filter which removes high frequency components from the second branch signal branched from said first detected signal;

a second loop filter which removes high frequency components from the fourth branch signal branched from said second detected signal;

a first feedback line coupling said optical local oscillator and said first loop filter; and a second feedback line coupling said optical phase controller and said second loop filter.

4. A homodyne optical receiver comprising:

a first polarization beam splitter which divides an optical signal into an optical signal with horizontal polarization and an optical signal with vertical polarization;

an optical local oscillator which outputs an optical local signal;

a second polarization beam splitter which divides said optical local signal into an optical local signal with horizontal polarization and an optical local signal with vertical polarization;

a first optical phase controller which controls a phase of said optical local signal with horizontal polarization;

a second optical phase controller which controls a phase of said optical local signal with vertical polarization;

a balanced receiver, which homodyne-detects said optical signal with horizontal polarization by using said optical signal with horizontal polarization to output a first detected signal;

a balanced receiver, which homodyne-detects said optical signal with vertical polarization by using said optical local signal with vertical polarization to output a second detected signal;

a first branch circuit, which branches said first detected signal into a first branch signal and a second branch signal;

a second branch circuit, which branches said second detected signal into a third branch signal and a fourth branch signal;

a first weighting circuit which assigns the first branch signal branched from said first detected signal a weight proportional to an amplitude thereof;

a second weighting circuit which assigns the third branch signal branched from said second detected signal a weight proportional to an amplitude thereof;

an adder, which adds output signals of said first weighting circuit and said second weighting circuit to output a received signal;

a first loop filter which removes high frequency components from the second branch signal branched from said first detected signal;

a second loop filter which removes high frequency components from the fourth branch signal branched from said second detected signal;

a first feedback line coupling said first optical phase controller and said first loop filter; and a second feedback line coupling said second optical phase controller and said second loop filter.

5. A homodyne optical receiver comprising:

a first polarization beam splitter which divides an optical signal into an optical signal with horizontal polarization and an optical signal with vertical polarization;

an optical local oscillator which outputs an optical local signal;

a second polarization beam splitter which divides said optical local signal into an optical local signal with horizontal polarization and an optical local signal with vertical polarization;

a first optical phase controller which controls a phase of said optical local signal with horizontal polarization;

a second optical phase controller which controls a phase of said optical local signal with vertical polarization;

a balanced receiver, which homodyne-detects said optical signal with horizontal polarization by using said optical local signal with horizontal polarization to output a first detected signal;

a balanced receiver, which homodyne-detects said optical signal with vertical polarization by using said optical local signal with vertical polarization to output a second detected signal;
a first branch circuit, which branches said first detected signal into a first branch signal and a second branch signal;
a second branch circuit, which branches said second detected signal into a third branch signal and a fourth branch signal;
a first weighting circuit which assigns the first branch signal branched from said first detected signal a weight proportional to an amplitude thereof;
a second weighting circuit which assigns the third branch signal branched from said second detected signal a weight proportional to an amplitude thereof;
an adder, which adds output signals of said first weighting circuit and said second weighting circuit to each other to output a received signal;
a first loop filter which removes high frequency components from the second branch signal branched from said first detected signal;
a second loop filter which removes high frequency components from the fourth branch signal branched from said second detected signal;
a first switch coupling said first optical phase controller and said first loop filter;
a second switch coupling said second optical phase controller and said second loop filter;
a first detection circuit which detects a first electric power of an output signal of said first loop filter;
a second detection circuit which detects a second electric power of an output signal of said second loop filter; and
a comparator, which compares said first electric power and said second electric power with each other to detect which is greater;
wherein in a case where said first electric power is higher than said second electric power, said comparator switches over said first switch and said second switch so that said optical local oscillator is controlled by an output signal from said first loop filter and said second optical phase controller is controlled by an output signal from said second loop filter; and in a case where said first electric power is lower than said second electric power, said comparator switches over said first switch and said second switch so that said optical local oscillator is controlled by an output signal from said second loop filter and said first optical phase controller is controlled by an output signal from said first loop filter.

6. A homodyne optical receiver comprising:
a first polarization beam splitter which divides an optical signal into an optical signal with horizontal polarization and an optical signal with vertical polarization;
an optical local oscillator which outputs an optical local signal;
a second polarization beam splitter which divides said optical local signal into an optical local signal with horizontal polarization and an optical local signal with vertical polarization;
a first optical phase controller which controls a phase of said optical local signal with horizontal polarization;
a second optical phase controller which controls a phase of said optical local signal with vertical polarization;
a balanced receiver, which homodyne-detects said optical signal with horizontal polarization by using said optical local signal with horizontal polarization to output a first detected signal;
a balanced receiver, which homodyne-detects said optical signal with vertical polarization by using said optical local signal with vertical polarization to output a second detected signal;
a first branch circuit, which branches said first detected signal into two signals;
a second branch circuit, which branches said second detected signal into two signals;
a first and a second weighting circuit which assign both of the two signals branched from said first detected signal a weight proportional to an amplitude thereof;
a third and a fourth weighting circuit which assign both of the two signals branched from said second detected signal a weight proportional to an amplitude thereof;
an adder, which adds output signals of said first weighting circuit and said third weighting circuit to each other to output a received signal;
a first loop filter which removes high frequency components from an output of said second weighting circuit;
a second loop filter which removes high frequency components from an output of said fourth weighting circuit;
a third loop filter which removes high frequency components from a signal obtained by adding outputs of said second weighting circuit and said fourth weighting circuit;
a first feedback line coupling said first optical phase controller and said second loop filter;
a second feedback line coupling said second optical phase controller and said second loop filter; and
a third feedback line coupling said optical phase controller and said first loop filter 7. A homodyne optical receiver comprising:
a first polarization beam splitter which divides an optical signal into an optical signal with horizontal polarization and an optical signal with vertical polarization;
an optical local oscillator which outputs an optical local signal;
a second polarization beam splitter which divides said optical local signal into an optical local signal with horizontal polarization and an optical local signal with vertical polarization;
an optical phase controller which controls a phase of said optical local signal with vertical polarization;
a balanced receiver, which homodyne-detects said optical signal with horizontal polarization by using said optical signal with horizontal polarization to output a first detected signal;
a balanced receiver, which homodyne-detects said optical signal with vertical polarization by using said optical local signal with vertical polarization to output a second detected signal;
a first branch circuit, which branches said first detected signal into two signals;
a second branch circuit, which branches said second detected signal into two signals;
a first and a second weighting circuit which assign both of the two signals branched from said first detected signal a weight proportional to an amplitude thereof;

a third and a fourth weighting circuit which assign both of the two signals branched from said second detected signal a weight proportional to an amplitude thereof;

an adder, which adds output signals of said first weighting circuit and said third weighting circuit to output a received signal a first loop filter which removes high frequency components from an output of said fourth weighting circuit;

a second loop filter which removes high frequency components from a signal obtained by adding output signals of said second weighting circuit and said fourth weighting circuit;

a first feedback line coupling said optical phase controller and said first loop filter; and a second feedback line coupling said optical local oscillator and said second loop filter.

* * * * *

UNITED STATES PATENT AND TRADEMARK OFFICE
CERTIFICATE OF CORRECTION

PATENT NO. : 5,323,258

DATED : 21 June 1994

INVENTOR(S) : Hideaki TSUSHIMA et al.

It is certified that error appears in the above-identified patent and that said Letters Patent is hereby corrected as shown below:

| Column | Line | |
|--------|------|---|
| 8 | 4 | After "optical" insert --local--. |
| 8 | 52 | After "optical" insert --local--. |
| 12 | 35 | Before "loop filter" change "second" to --first--. |
| 12 | 38 | Change "phase con-" to --local oscillator--. |
| 12 | 39 | Delete "troller"; change "first" to --third--. |

Signed and Sealed this

Twenty-eighth Day of November, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO.     : 5,323,258
DATED          : June 21, 1994
INVENTOR(S)    : Hideaki Tsushima et al.

It is certified that error appears in the above-identified patent and that said Letters Patent is hereby corrected as shown below:

Column 8,
Line 5, After "optical" insert -- local --.
Line 53, After "optical" insert -- local --.

Column 12,
Line 35, Before "loop filter" change "second" to -- first --.
Line 38, Change "phase con-" to -- local oscillator --.
Line 39, Delete "troller"; change "first" to -- third --.

Signed and Sealed this

Twenty-first Day of August, 2001

*Attest:*

*Attesting Officer*

NICHOLAS P. GODICI
*Acting Director of the United States Patent and Trademark Office*